United States Patent
Jeong et al.

(10) Patent No.: US 9,787,335 B1
(45) Date of Patent: Oct. 10, 2017

(54) METHOD AND APPARATUS FOR DETERMINING VALIDITY OF SAMPLES FOR DIGITAL PRE-DISTORTION APPARATUS

(71) Applicants: KMW INC., Hwaseong, Gyeonggi-do (KR); HANBAT National Industry Academic Cooperation Foundation, Daejeon (KR)

(72) Inventors: Bae-Mook Jeong, Gyeonggi-do (KR); Min-Seon Yun, Gyeonggi-do (KR); Eui-Rim Jeong, Daejeong (KR); Kwang-Pyo Lee, Daejeon (KR); Haeng-Bok Kil, Daejeon (KR); Sungmi Jo, Daejeon (KR)

(73) Assignees: KMW INC., Hwaseong, Gyeonggi-do (KR); HANBAT National Industry Academic Cooperation Foundation, Daejeon (KR)

( * ) Notice: Subject to any disclaimer, the term of this patent is extended or adjusted under 35 U.S.C. 154(b) by 0 days.

(21) Appl. No.: 15/175,852

(22) Filed: Jun. 7, 2016

Related U.S. Application Data

(63) Continuation of application No. PCT/KR2016/005691, filed on May 30, 2016.

(30) Foreign Application Priority Data

May 23, 2016 (KR) ........................ 10-2016-0062991

(51) Int. Cl.
*H04K 1/02* (2006.01)
*H04L 25/03* (2006.01)
*H04L 25/49* (2006.01)
*H04B 1/04* (2006.01)

(52) U.S. Cl.
CPC ..... *H04B 1/0475* (2013.01); *H04B 2001/045* (2013.01); *H04B 2001/0408* (2013.01)

(58) Field of Classification Search
CPC ........... H03F 1/3247; H03F 2201/3233; H04B 1/0475; H04B 2001/0408; H04B 2001/045
See application file for complete search history.

(56) References Cited

U.S. PATENT DOCUMENTS

| | | | |
|---|---|---|---|
| 6,356,146 B1 * | 3/2002 | Wright | .................. H03F 1/3241 330/149 |
| 6,570,444 B2 * | 5/2003 | Wright | .................. H03H 11/04 330/149 |
| 7,058,369 B1 * | 6/2006 | Wright | .................. H01Q 1/243 375/297 |
| 8,023,588 B1 * | 9/2011 | Benson | ............. H04L 25/03343 330/147 |

(Continued)

*Primary Examiner* — Shuwang Liu
*Assistant Examiner* — Sung Ahn
(74) *Attorney, Agent, or Firm* — Mintz Levin Cohn Ferris Glovsky and Popeo, P.C.; Kongsik Kim; Colleen H. Witherell

(57) ABSTRACT

A method and an apparatus for determining validity of samples for a digital pre-distortion apparatus is disclosed. It is an object of at least one embodiment to provide a method and an apparatus for determining validity of samples for a digital pre-distortion apparatus that is configured to compensate for nonlinearity of a power amplifier in an efficient manner by accurately estimating a pre-distortion coefficient with a low-capacity memory.

10 Claims, 9 Drawing Sheets

(56) References Cited

U.S. PATENT DOCUMENTS

| | | | | |
|---|---|---|---|---|
| 8,229,025 B1* | 7/2012 | Summerfield | ........ | H04L 27/368 375/285 |
| 8,737,523 B2* | 5/2014 | Barnes | .................. | H03F 1/3247 375/296 |
| 8,787,494 B2* | 7/2014 | Bai | ...................... | H03F 1/3247 327/291 |
| 2008/0157869 A1* | 7/2008 | Bhandari | .............. | H03F 1/3247 330/149 |
| 2009/0302940 A1* | 12/2009 | Fuller | ................... | H03F 1/3247 330/149 |
| 2010/0117729 A1* | 5/2010 | Shako | .................. | H03F 1/3247 330/149 |
| 2011/0025414 A1* | 2/2011 | Wolf | .................... | H03F 1/3247 330/149 |

\* cited by examiner

METHOD AND APPARATUS FOR DETERMINING VALIDITY OF SAMPLES FOR DIGITAL PRE-DISTORTION APPARATUS

CROSS-REFERENCE TO RELATED APPLICATIONS

This is a continuation application of International Application No. PCT application PCT/KR2016/005691 filed on May 30, 2016, which claims priority to Korean Application No. 10-2016-0062991 filed on May 23, 2016. The applications are incorporated herein by reference.

TECHNICAL FIELD

The present invention in some embodiments relates to a method and an apparatus for determining whether or not a sample stored in a memory is a valid sample for estimating a digital pre-distortion coefficient in a stable manner in a digital pre-distortion apparatus for compensating for nonlinearity of a power amplifier.

BACKGROUND

The statements in this section merely provide background information related to the present disclosure and do not necessarily constitute prior art.

A power amplifier is an essential part for transmitting a signal in a communication system. In general, the power amplifier is driven in a low-power level to operate with linear characteristics instead of being driven in a saturated level with much nonlinear characteristics, considering signal quality and interference with a neighboring band. However, if the power amplifier is driven with a power lower than the saturated power, the efficiency of the power amplifier is lowered by about 10% to 20%.

The digital pre-distortion (PDP), which is one of the linearization techniques to improve the efficiency of the power amplifier, is getting an attention as an effective technique that can be achieved with simple structure and low cost. Specifically, the digital pre-distortion linearizes a nonlinear power amplifier by obtaining digital pre-distortion characteristics corresponding to an inverse function of the nonlinear power amplifier and applying the digital pre-distortion characteristics to an inpuit signal.

Characteristics of the power amplifier tend to vary with time, power and temperature, and hence the corresponding inverse function is to be obtained by continuously tracking the nonlinear characteristics. To this end, the digital pre-distortion amplifier calculates a pre-distortion parameter for applying the pre-distortion to the signal inputted to the power amplifier from the transmission signal and the output signal outputted from the preamplifier.

The digital pre-distortion apparatus calculates the pre-distortion parameter by using a plurality of samples acquired from a transmission signal, and hence in order to obtain an accurate pre-distortion parameter, a sufficiently large number of samples having various signal amplitudes are needed. However, the more samples need the more capacity of a memory, which increases the load of the hardware and also increases the cost.

Even when a sufficiently large number of samples are collected using a large-capacity memory, if some inappropriate samples are included in the collected samples, it may be hard to obtain accurate pre-distortion characteristics due to an error caused by the inappropriate samples. For example, when the signal is a time division duplex (TDD) signal, there is a risk that samples having no signal are included in the collected samples.

SUMMARY

The present invention has been made in view of the above aspects, and at least one embodiment of the present invention seeks to provide a method and an apparatus for determining validity of samples for a digital pre-distortion apparatus that is configured to compensate for nonlinearity of a power amplifier in an efficient manner by accurately estimating a pre-distortion coefficient with a low-capacity memory.

Some embodiments of the present invention provide a method for determining the validity of samples used to estimate a pre-distortion coefficient by a digital pre-distortion apparatus for compensating for a nonlinearity of a power amplifier, including acquiring a predetermined number N (a natural number) of input samples from an input signal to be inputted into the power amplifier, first determining including classifying the input samples into a plurality of groups based on magnitudes of the input samples, and determining the validity of the input samples based on a distribution of classified input samples, and second determining including determining, when the input samples are determined to be valid, the input samples as samples to be inputted to a pre-distortion algorithm for estimating the pre-distortion coefficient.

Another embodiment provides an apparatus for determining the validity of samples used to estimate a pre-distortion coefficient for compensating for a nonlinearity of a power amplifier, including an acquiring unit, a sample validity determining unit and a sample determining unit. The acquiring unit is configured to acquire a predetermined number N (a natural number) of input samples from an input signal to be inputted into the power amplifier. The sample validity determining unit is configured to classify the input samples into a plurality of groups based on the magnitudes of the input samples and to determine whether or not the input samples are valid to compensate for the nonlinearity of the power amplifier based on distribution of classified input samples. And the sample determining unit is configured to determine, when it the input samples are determined to be valid, the input samples as samples to be inputted to a pre-distortion algorithm for estimating the pre-distortion coefficient.

According to some embodiments of the present invention, nonlinearity of a power amplifier can be compensated in an efficient manner by accurately estimating a pre-distortion coefficient with a low-capacity memory in the digital pre-distortion for compensating for the nonlinearity of the power amplifier.

According to some embodiments of the present invention, degradation of linearization performance due to inappropriate samples can be prevented by determining in advance whether or not the samples inputted in the pre-distortion algorithm are valid samples.

According to some embodiments of the present invention, a pre-distortion apparatus can be achieved with a low-capacity memory, and hence the cost of the entire system can be reduced, complexity of the operation can be lowered, and the reliability of the linearization performance of the power amplifier can be enhanced.

REFERENCE NUMERALS

Figure 1:
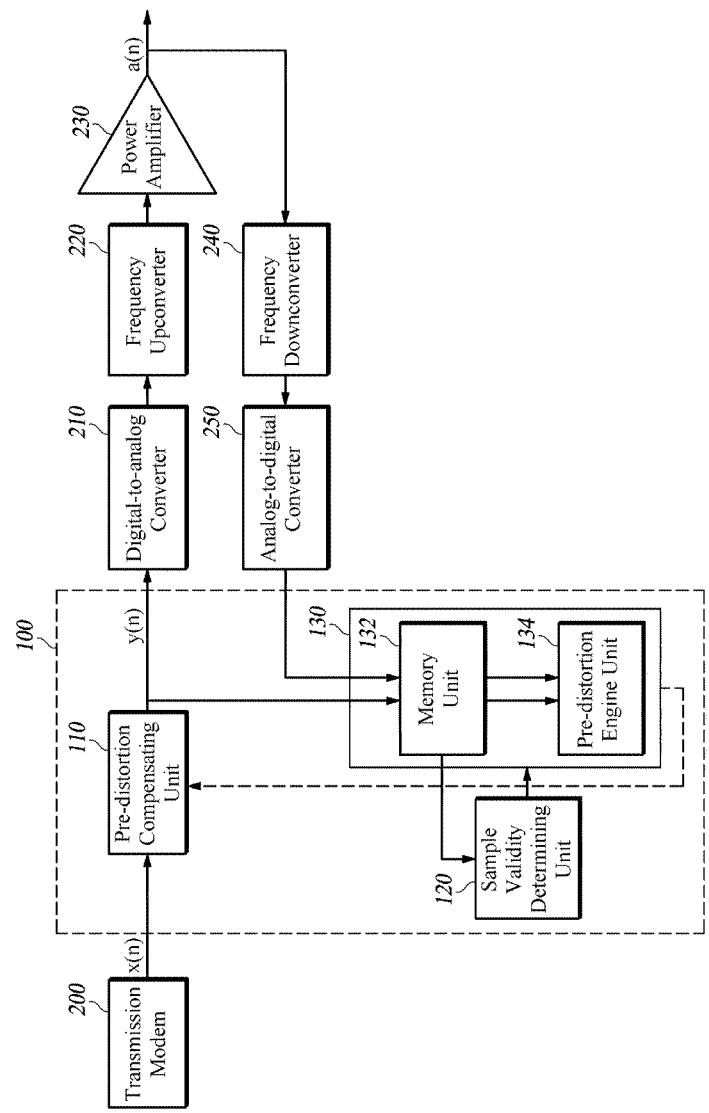
FIG. 1 is a block diagram of a digital pre-distortion system according to some embodiments of the present invention.

100: Digital pre-distortion apparatus
110: Pre-distortion compensating unit
120: Sample validity determining unit
130: Pre-distortion control unit
132: Memory unit
134: Pre-distortion engine unit
230: Power amplifier

DETAILED DESCRIPTION

Exemplary embodiments of the present disclosure are described in detail below with reference to the accompanying drawings. In the following descriptions, like reference numerals designate like elements, although the elements are shown in different drawings. Further, detailed descriptions of known functions and configurations incorporated herein are omitted for the purpose of clarity and for brevity.

Additionally, various terms such as first, second, A, B, etc., are used solely for the purpose of differentiating one component from the other but not to imply or suggest the substances, the order or sequence of the components. In the entire specification, when a portion "comprises" or "includes" a constituent element, this does not mean to exclude another constituent element unless otherwise described particularly in view of the opposite aspect but means that another constituent element can be further included. In addition, terms such as " . . . unit" described in the specification means a unit of processing at least one function or operation, which can be implemented by hardware, software, or a combination of hardware and software.

The detailed description provided below with the accompanying drawings is to instantiate exemplary embodiments of the present invention, which should not be deemed to describe the only embodiments that can be achieved by the present disclosure.

FIG. 1 is a block diagram of a digital pre-distortion system according to some embodiments of the present invention.

As shown in FIG. 1, the digital pre-distortion system according to some embodiments of the present invention includes a transmission modem 200, a digital pre-distortion apparatus 100, a digital-to-analog converter 210, an analog-to-digital converter 250, a frequency upconverter 220, a frequency downconverter 240 and a power amplifier 230.

The digital pre-distortion apparatus 100 includes a pre-distortion compensating unit 110, a sample validity determining unit 120 and a pre-distortion control unit 130. The pre-distortion control unit 130 includes a memory unit 132 and a pre-distortion engine unit 134.

The digital pre-distortion system shown in FIG. 1 an example according to some embodiments of the present invention, which means that all the elements shown in FIG. 1 are not essential, and in some embodiments, some elements can be added, changed, or removed.

The transmission modem 200 generates a transmission signal, i.e., an input signal x(n) to be inputted to the power amplifier 230. The pre-distortion compensating unit 110 pre-distorts the input signal x(n) by using a pre-distortion coefficient. That is, the pre-distortion compensating unit 110 pre-distorts the input signal x(n) with an inverse function of the characteristics of the power amplifier 230. A pre-distortion signal y(n) is converted into an analog signal by a digital-to-analog converter, converted into a radio frequency (RF) signal by a frequency upconverter, and then amplified by the power amplifier 230. The input signal x(n) is distorted with the inverse function of the characteristics of the power amplifier 230, and hence an output signal a(n) outputted from the power amplifier 230 is linearly amplified.

As the characteristics of the power amplifier 230 vary with time, power, and temperature as described above, the pre-distortion coefficient needs to be updated from time to time or continuously. That is, the nonlinear characteristics of the power amplifier 230 needs to be tracked continuously to regain the inverse function. To this end, the digital pre-distortion apparatus according to some embodiments further includes a circuit to feed back the output signal of the power amplifier 230.

In order to obtain the inverse function of the power amplifier 230, i.e., the pre-distortion characteristics, the input signal and the output signal of the power amplifier 230 are needed. The input signal and the output signal of the power amplifier 230 are stored in the memory unit 132 of the pre-distortion control unit 130. Samples of the input signal and the output signal are also stored in the memory unit 132.

The pre-distortion engine unit 134 of the pre-distortion control unit 130 estimates the pre-distortion coefficient by performing an operation for obtaining the pre-distortion characteristics from the input signal and the output signal of the power amplifier 230 by using a processor. That is, the pre-distortion engine unit 134 estimates the pre-distortion coefficient to improve the linear characteristics of the power amplifier 230 by obtaining the degree of the nonlinear distortion of the output signal of the power amplifier 230 with respect to the input signal of the power amplifier 230.

Specifically, the pre-distortion engine unit 134 calculates or estimates the pre-distortion coefficient by using a pre-distortion algorithm. The pre-distortion algorithm includes an adaptive algorithm for continuously updating the pre-distortion coefficient according to the changing signal by using the input and output signals.

In some embodiments, the adaptive algorithm includes, but not limited to, least mean square (LMS) algorithm and recursive least square (RLS) algorithm, and therefore various types of adaptive algorithm can be employed.

The pre-distortion engine unit 134 operates until the pre-distortion coefficient is converged by updating the pre-distortion coefficient in a repeated manner by applying the adaptive algorithm to the samples stored in the memory unit 132. The finally converged value may be estimated as the pre-distortion coefficient, and is applied to the pre-distortion compensating unit 110.

The pre-distortion compensating unit 110 pre-distorts the input signal inputted to the power amplifier 230 by using the pre-distortion coefficient estimated by the pre-distortion engine unit 134. While updating the pre-distortion coefficient by tracking the change of the characteristics of the power amplifier, the pre-distortion compensating unit 110 is deactivated, and the input signal x(n) is bypassed to the memory unit 132.

The pre-distortion engine unit 134 can calculate the pre-distortion coefficient having better characteristics as the samples stored in the memory unit 132 become longer, which can linearize the power amplifier 230 more ideally. However, as the length of the samples increases, a larger-capacity memory is needed to store the samples, which increases the load of the hardware and also increases the cost.

On the other hand, even when the samples are sufficiently long, if they include a number of samples that are not appropriate to calculate the pre-distortion coefficient, an error increases in calculating the pre-distortion characteristics, which finally affects the linearization of the power amplifier 230. The samples that are inappropriate to calculate the pre-distortion coefficient includes, for example, consecutive samples having a constant magnitude, samples having too large or too small magnitude to apply the pre-distortion compensation, and samples having magnitude of '0'.

In order to solve the above-mentioned problems, the digital pre-distortion apparatus 100 according to some embodiments estimates the optimum pre-distortion coefficient even with a small-capacity memory by determining the validity of the samples, i.e., whether the samples are appropriate to calculate the pre-distortion coefficient.

The sample validity determining unit 120 includes an input unit (not shown), a validity determining unit (not shown) and a sample determining unit (not shown).

The input unit (not shown) of the sample validity determining unit 120 acquires a predetermined number N (a natural number) of input samples from the input signal. The validity determining unit (not shown) classifies the input samples into a plurality of groups by the magnitude, and determines whether the input samples are valid to compensate the nonlinearity of the power amplifier 230 based on the distribution of the classified input samples. When it is determined that the input samples are valid, the sample determining unit (not shown) determines the valid input samples as samples to be inputted to the pre-distortion algorithm for estimating the pre-distortion coefficient, and sends the determined samples to the pre-distortion control unit 130 to update the pre-distortion coefficient.

The sample validity determining unit 120 is described in detail below with reference to FIG. 2.

Figure 2:
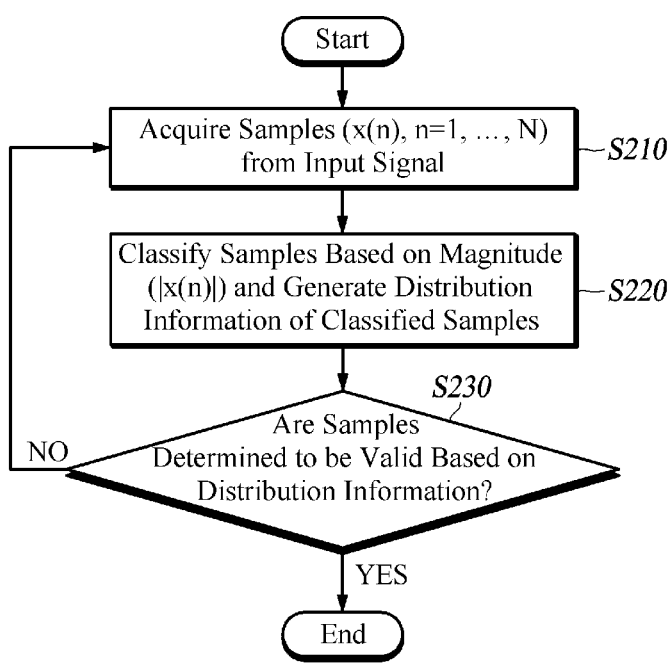
FIG. 2 is a flowchart of a method for determining the validity of input samples by a digital pre-distortion apparatus according to some embodiments of the present invention.

FIG. 2 is a flowchart of a method for determining the validity of input samples by the digital pre-distortion apparatus according to some embodiments of the present invention.

The sample validity determining unit 120 acquires N input samples (x(n), n=1, . . . , N) from the input signal (Step S210). After Step S210, the sample validity determining unit 120 classifies the acquired input samples into a plurality of groups by the magnitude, and generates distribution information of the classified input samples (Step S220). When it is determined that the input samples are invalid based on the distribution information (NO at Step S230), the sample validity determining unit 120 repeats Steps S210 to S230.

That is, when the input samples are invalid, the sample validity determining unit 120 re-acquires N input samples from the input signal to determine the validity, and repeats the step of determining the validity by re-acquiring the input samples until it is determined that the input samples are valid.

Although FIG. 2 shows that Steps S210 to S230 are performed in a sequential manner, the present invention is not limited to this scheme. The steps shown in FIG. 2 can be performed in a modified manner or performed in parallel, and therefore the steps shown in FIG. 2 are not limited to the chronological order.

In some embodiments, the plurality of groups into which the input samples are classified includes a first group which is beyond a predetermined range of magnitudes between an upper threshold and a lower threshold and a plurality of second groups which are within the predetermined range of the magnitudes and are quantitatively divided by a plurality of sub-ranges.

The sample validity determining unit 120 according to some embodiments classifies the input samples into a plurality of groups including the first group and the second group, in order to filter inappropriate samples and extract samples having various magnitudes. The first group may indicate a group of invalid samples, and the second may indicate a group of valid samples.

When the number of samples belonging to the first group is equal to or smaller than a predetermined ratio and when the number of samples belonging to each of the second groups is within a predetermined ratio, the sample validity determining unit 120 determines that the input samples are valid.

This is described in detail below with reference to Table 1.

TABLE 1

| | | |
|---|---|---|
| First Group | Table 1 | $|x(n)| = 0$ or $|x(n)| > 0.7$ |
| Second Group | Table 2 | $0 < |x(n)| \leq 0.2$ |
| | Table 3 | $0.2 < |x(n)| \leq 0.4$ |
| | Table 4 | $0.4 < |x(n)| \leq 0.6$ |
| | Table 5 | $0.6 < |x(n)| \leq 0.7$ |

As shown in Table 1, the first group may include table 1, and the second groups may include tables 2 to 5. The number of tables and the conditions corresponding to the respective tables are examples only and are not limited thereto and may vary according to the transmission system environment.

The table 1 in the first group indicates a magnitude condition of invalid samples. More specifically, it indicates cases that the magnitude of the input samples is zero (the size of the samples less than lower threshold), or that the magnitude of the samples is so large that the pre-distortion compensation cannot be applied.

The tables 2 to 5 in the plurality of the second groups indicate the magnitude conditions of the valid samples. The plurality of the second groups is used in figuring out how variously the sizes of the input samples are distributed by dividing the interval that spans from the lower threshold, e.g., zero to the upper threshold, e.g., 0.7.

The tables are set to "0" as the initial condition. The input samples are classified according to the conditions of the tables and the number of the input samples corresponding to the tables can be cumulatively stored.

The sample validity determining unit 120 determines whether the number of the input samples accumulated in the table 1 of the first group is less than a predetermined ratio. In case the number of the input samples accumulated in the first group is more than or equal to a predetermined ratio, it is determined that the input samples are invalid. In some embodiments, the sample validity determining unit 120 determines that the input samples are invalid when the input samples keep the constant magnitude for a predetermined time.

The sample validity determining unit 120 determines whether the number of the samples of each of the second group is within a predetermined range (e.g., 0.25%). Referring to [Table 1] for instance, in case the ratio of the number of the input samples belonging to table 2 through table 5 to the total number (N) of the input samples is more than or equal to 0.25%, it can be determined that the input samples are distributed in various magnitudes.

When it is determined that the input samples are invalid, the sample validity determining unit 120 according to some embodiments determines whether or not updated input samples are valid for compensating a non-linearity of the power amplifier 230 upon acquiring the updated input samples. The updated input samples refer to at least part of the input samples that are updated. The updated input samples are useful for reducing the amount of calculations required for determining the validity of the samples. To this end, some input samples are eliminated, and the distribution information of the rest samples are used "as is."

For determining the validity of the input samples, in some embodiments, the sample validity determining unit 120 eliminates part of the input samples, and acquires, from the input samples, consecutive samples as many as the eliminated samples, and classifies the consecutive samples into a plurality of groups and finally determines the validity of the classifies input samples based on the classified input samples. Here, the eliminated samples may be initial M (M is a natural number less than or equal to N) of samples among the input samples.

In some embodiments, the sample validity determining unit 120 determines the validity of the input samples by using an average and a variance of the input samples. For instance, it determines whether the input samples fall within the range between the lower threshold and the upper threshold upon calculating the average of the magnitudes of the input samples. This is for determining whether the input samples are properly sized or not for estimating the pre-distortion coefficients. When it is determined that the average meets a the condition, the sample validity determining unit 120 determines whether the input samples exceed the upper threshold by calculating the variance (or standard deviation) of the magnitudes of the input samples. The calculation is for determining how various the magnitudes of the input samples are.

The digital pre-distortion apparatus 100 according to some embodiments further includes a controlling unit (not drawn) which is configured to activate the operations of the sample validity determining unit 120 and pre-distortion engine unit 134 at predetermined intervals.

Figure 3:
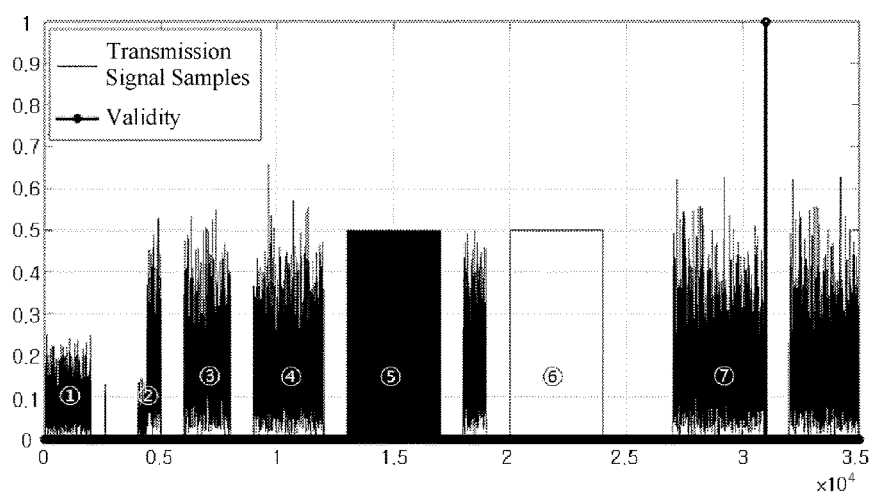
FIG. 3 is a graph showing a result obtained from a simulation of the method of determining the validity of the input samples by the digital pre-distortion apparatus according to some embodiments of the present invention.

FIG. 3 is a graph showing a result obtained from a simulation of the method for determining the validity of the input samples by the digital pre-distortion apparatus according to some embodiments of the present invention.

The simulation was performed to find 4,000 samples having various magnitudes. This simulation is performed based on the values given in [Table 1], and is designed to yield '1' when the input samples are determined to be valid.

① in FIG. 3 represents 2,000 samples having magnitudes 0~0.2; ② represents 1,000 samples having various magnitudes; ③ represents 2,000 samples having various magnitudes; ④ represents 3,000 samples having various magnitudes; ⑤ represents 4,000 samples having repetitive magnitudes between '0' and '0.5'; ⑥ represents 40,000 samples having a constant magnitude of '0.5'; and ⑦ represents 4,000 samples having various magnitudes. The proper samples for pre-distortion corresponds to the samples of ⑦ and it can be seen from the test results that '1' is outputted at ⑦.

Figure 4A:
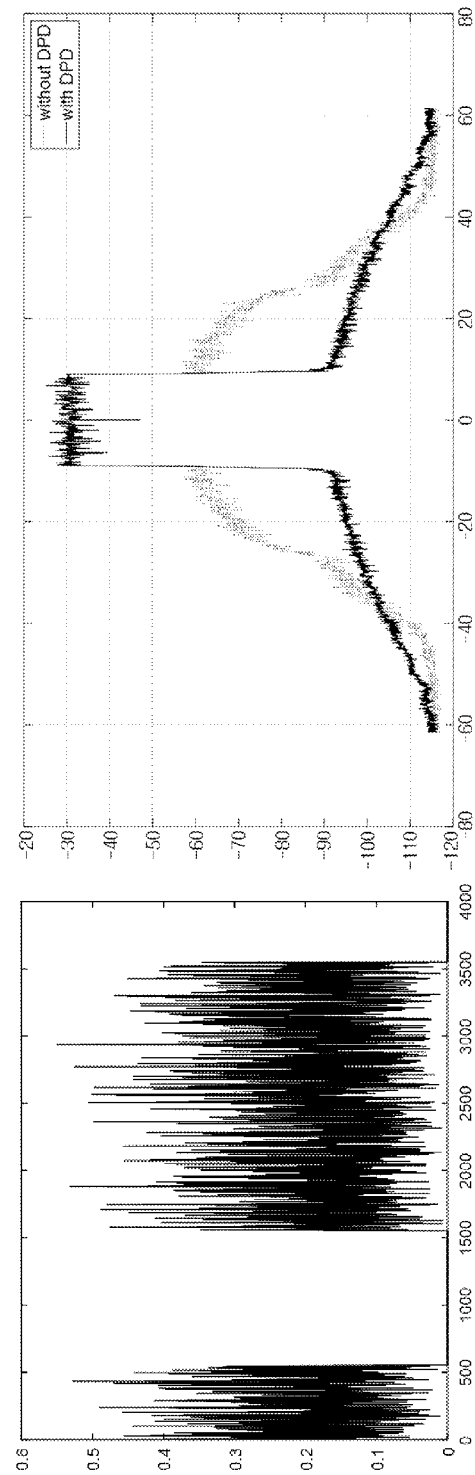
FIGS. 4A and 4B are graphs showing a spectral performance of the digital pre-distortion apparatus according to some embodiments of the present invention.
Figure 4B:
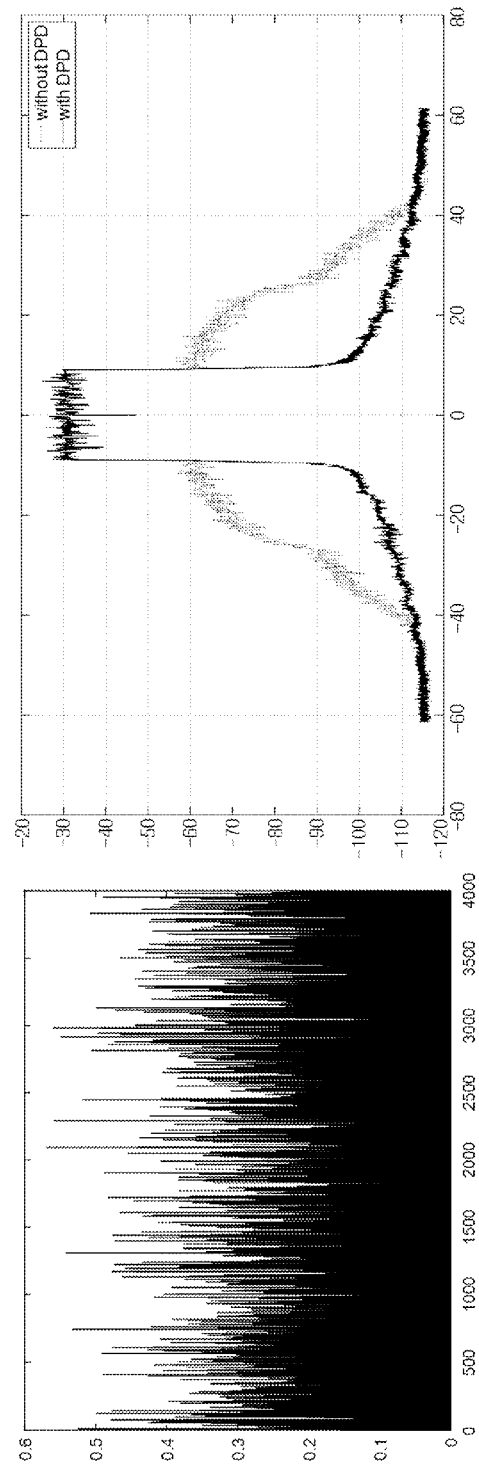

FIGS. 4A and 4B are graphs showing a spectral performance of the digital pre-distortion apparatus according to some embodiments of the present invention.

FIGS. 4A and 4B show a spectrum performance in accordance with some embodiments when the LTE-TDD signals having a bandwidth of 20 MHz are used. The lefthand-side graphs of the FIGS. 4A and 4B represent envelope magnitudes over time of 4,000 samples used in the pre-distortion and the righthand-side graphs represent the output spectrum of the power amplifier. FIGS. 4A and 4B represent the spectrums both in case that the pre-distortion is applied and in case that the pre-distortion is not applied. Further description on each spectrum depicted in FIGS. 4A and 4B will now be given.

FIG. 4A is a case that the sample validity determining algorithm is not applied. It exhibits a degradation of linearization performance of the power amplifier due to invalid samples. On the other hand, FIG. 4B shows utilizing valid samples by applying the sample validity determining algorithm to provide a superior linearization performance to the case of FIG. A.

Figure 5:
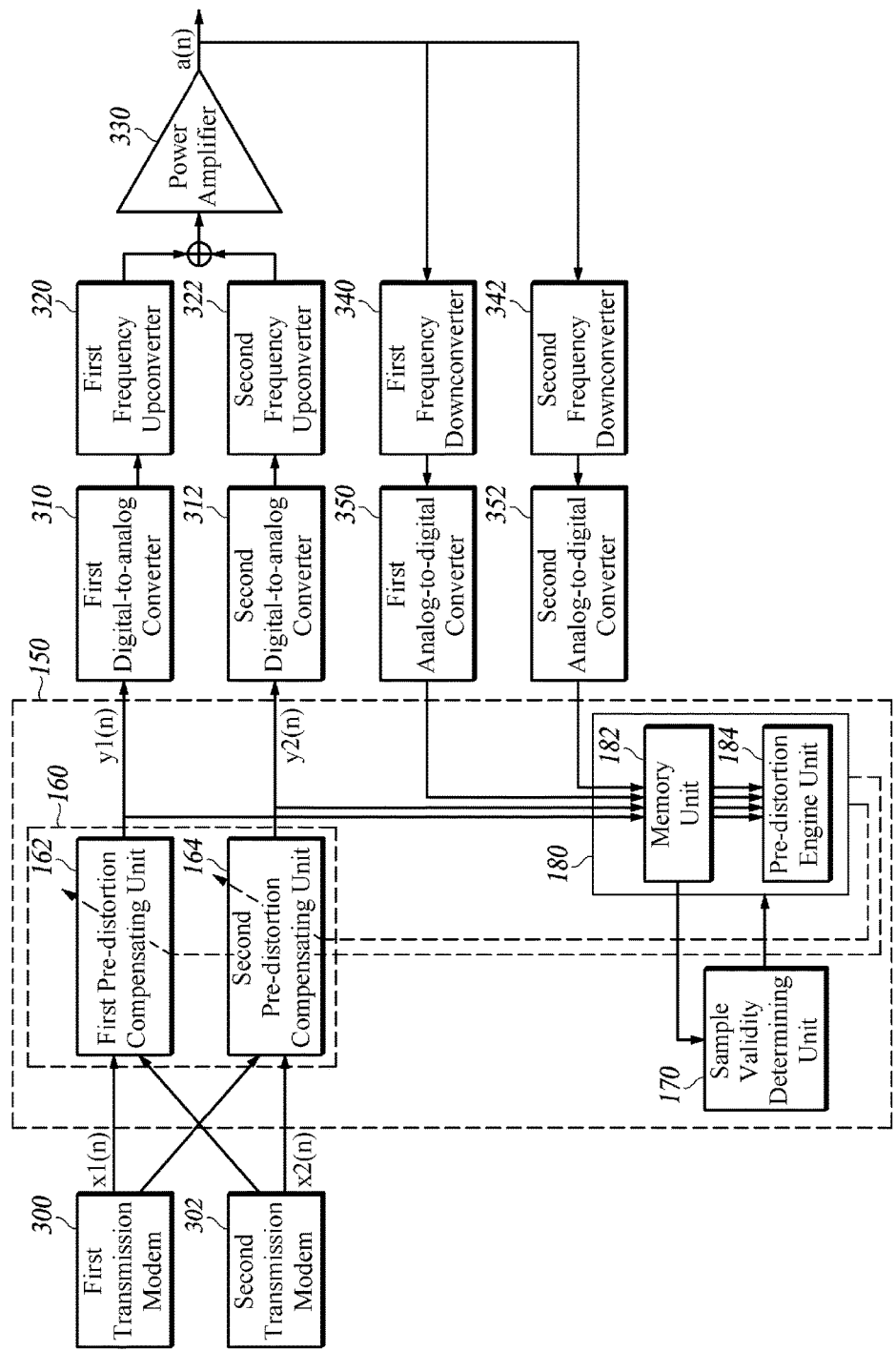
FIG. 5 is a block diagram of a digital pre-distortion system for a multiple-band transmitter according to some embodiments of the present invention.

FIG. 5 is a block diagram of a digital pre-distortion system using a multiple-band transmitter according to some embodiments of the present invention.

FIG. 5 shows a digital pre-distortion system using a multiple-band transmitter, which is an extension of a single-band transmitter of FIG. 1 and therefore each element corresponds to that of FIG. 1. FIG. 5 shows an example double-band transmitter but can be extended to more than double or multiple-band.

When a single power amplifier is used with respect to multiple-band signals as shown in FIG. 5, a cross-distortion can occur between the respective band signals due to a non-linear amplification of the multiple-band signals. To linearize signals in each of different bands, linearization needs to be done utilizing other band signals than the signals of relevant band. In light of this, the digital pre-distortion system for a multiple-band transmitter requires various sizes of samples in every band.

The digital pre-distortion system for a multiple-band transmitter operates basically in the same manner as the digital pre-distortion system using a single-band transmitter but exhibits a difference that it determines samples as being proper to a multiple-band pre-distortion only when all the band signals meet an effective sample validity requirement.

This is described in more detail with reference to FIG. 6.

Figure 6:
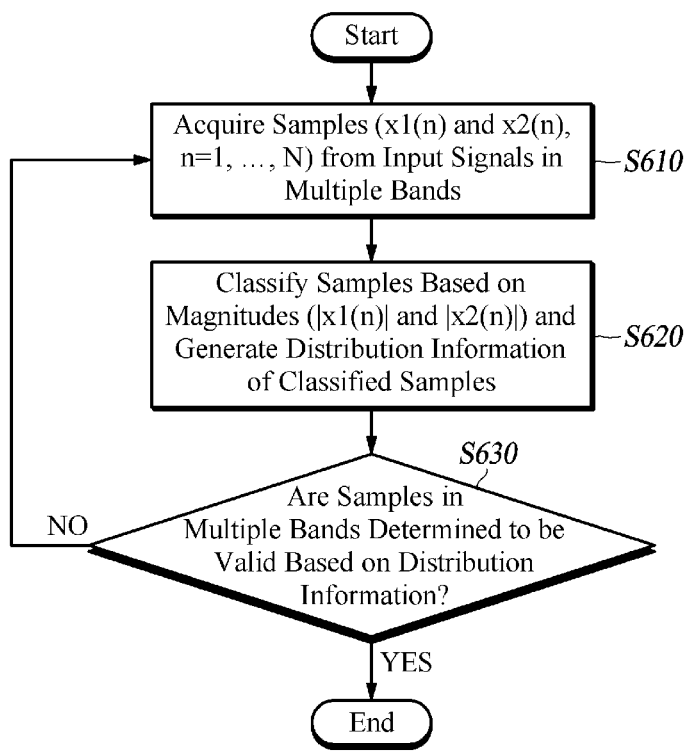
FIG. 6 is a flowchart of a method for determining the validity of input samples by a digital pre-distortion apparatus for the multiple-band transmitter according to some embodiments of the present invention.

FIG. 6 is a flowchart of a method for determining the validity of input samples by a digital pre-distortion apparatus for the multiple-band transmitter according to some embodiments of the present invention.

A sample validity determining unit 170 for processing multi-band signals acquires a predetermined number (N) of input samples ((x1(n) and x2(n), n=1, . . . , N) from input signals of multiple-bands (Step S610). It classifies the input samples into a plurality of groups by their sizes and generates distribution information of the classified input samples (Step S620), and determines, based on the generated information, whether the input samples of the multiple-bands are proper for compensating the non-linearity of a power amplifier 330 (Step S630). Steps S610 to S630 can be repeated until the proper sample are acquired.

Steps S610 to S630 are sequentially illustrated in FIG. 6 but are not limited thereto. In other words, some of the steps in FIG. 6 can be executed in parallel or in other sequential orders, and hence the example shown in FIG. 6 is not limited to the chronological order.

Figure 7A:
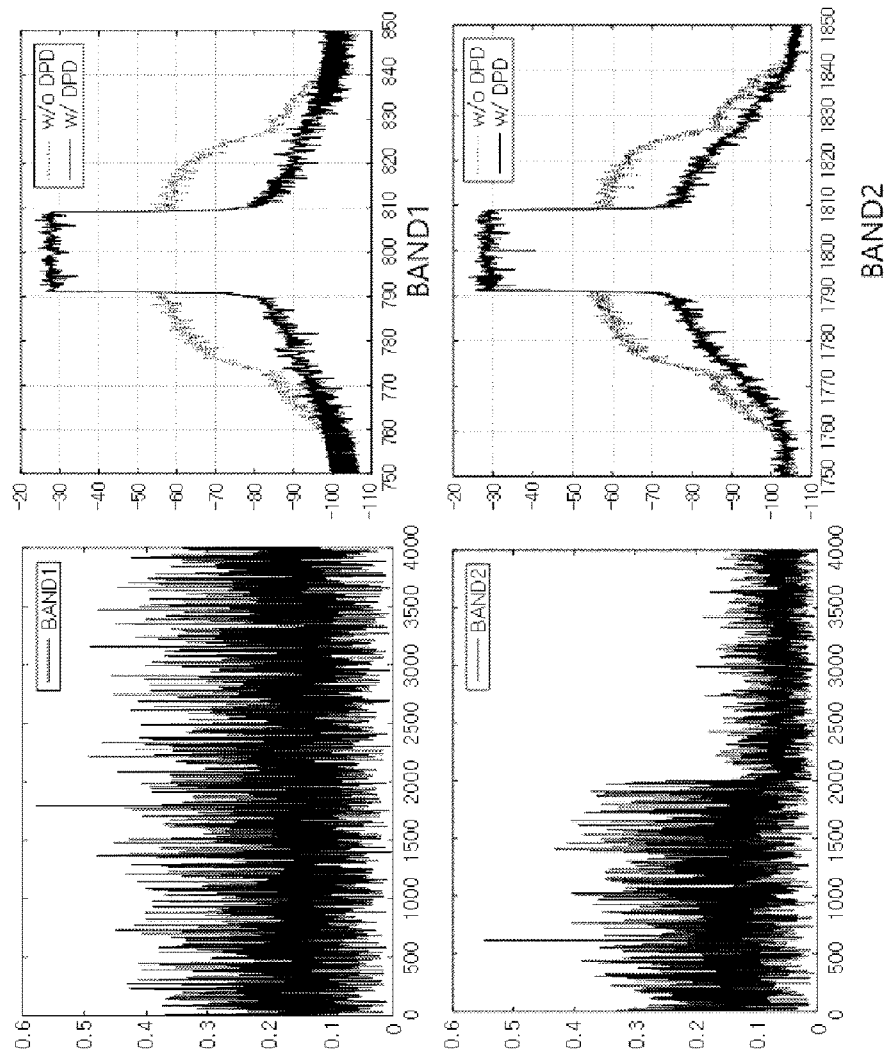
FIGS. 7A and 7B are graphs showing a spectral performance of the digital pre-distortion apparatus for the multiple-band transmitter according to some embodiments of the present invention.
Figure 7B:
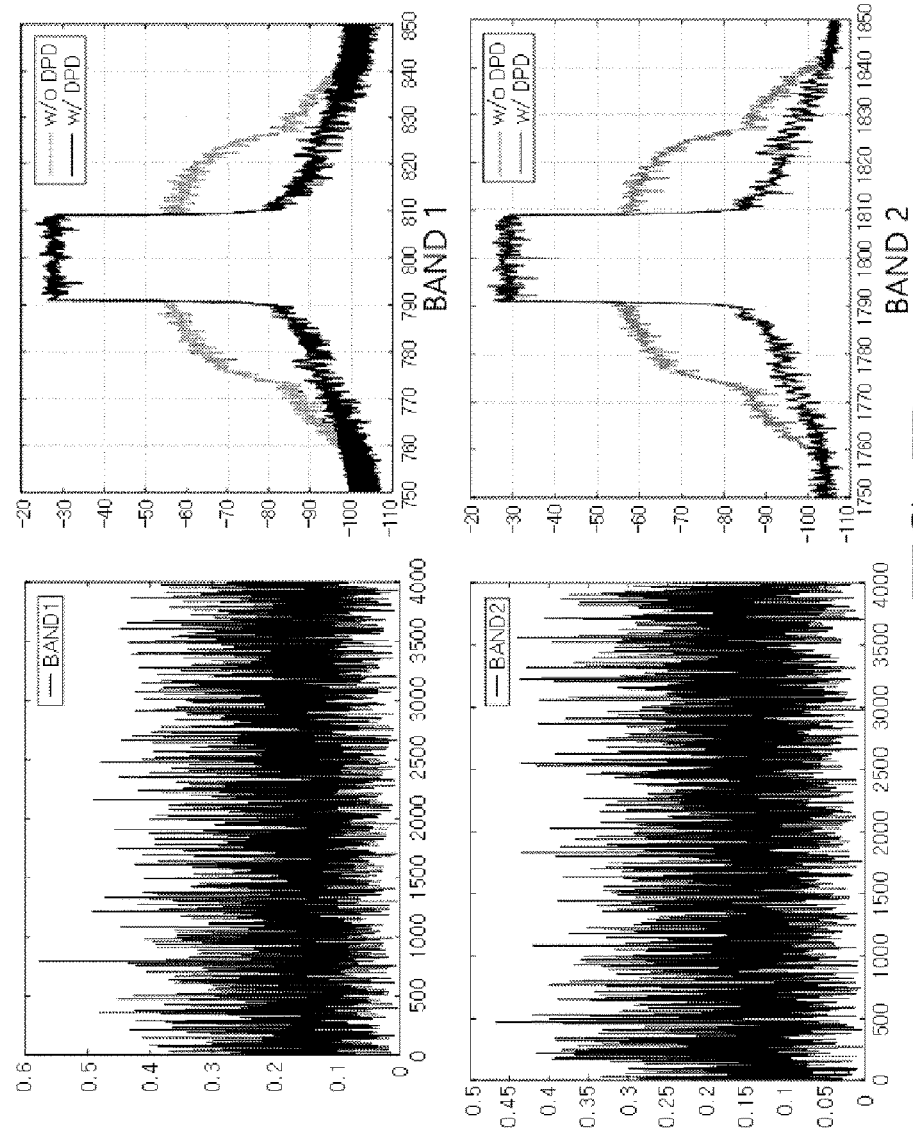

FIGS. 7A and 7B are graphs showing spectral performance of the digital pre-distortion apparatus for the multiple-band transmitter according to some embodiments of the present invention.

FIGS. 7A and 7B show a spectral performance of the digital pre-distortion apparatus for the dual-band transmitter dealing with LTE-TDD signals of 20 MHz bandwidth in accordance with an aspect of the present invention. The lefthand-side graphs of FIGS. 7A and 7B show an envelope magnitude of 4000 samples used in the pre-distortion over time, and the righthand-side graphs show the output spectrum of the power amplifier. A detailed description for the spectrums are as follows.

Referring to FIG. 7A instantiating a spectral performance without applying the sample validity determining algorithm of the present aspect of the invention, BAND 1 has valid samples, whereas BAND 2 does not have valid samples. From the samples, degradation of linearization performance can be seen due to invalid samples. On the other hand, FIG. 7B instantiates utilizing valid samples by applying the sample validity determining algorithm in accordance with the present aspect of the invention, and thereby exhibits superior performance to FIG. 7A.

The respective steps of the flowcharts of the method for determining the validity of input samples by the digital pre-distortion apparatus according to some embodiments shown in FIGS. 2 and 6 can be implemented as a program and stored in a computer-readable recording medium. The computer-readable recording medium includes any type of recording device on which data that can be read by a computer system are recordable. Examples of the computer-readable recording medium include magnetic recording medium such as a ROM, a floppy disk, hard disk, etc. and optically readable medium such as a CD-ROM, DVD, etc. and a carrier wave e.g., transmission through the Internet. Further, the computer-readable recording medium can be distributed in computer systems connected via a network, and computer-readable codes can be stored and executed in a distributed mode.

Although exemplary embodiments of the present invention have been described for illustrative purposes, those skilled in the art will appreciate that various modifications, additions and substitutions are possible, without departing from the idea and scope of the claimed invention. Accordingly, one of ordinary skill would understand the scope of the claimed invention is not to be limited by the explicitly described above embodiments but by the claims and equivalents thereof.

The invention claimed is:

1. A method for determining a validity of samples used to estimate a pre-distortion coefficient by a digital pre-distortion apparatus for compensating for a nonlinearity of a power amplifier, the method comprising:
   acquiring a predetermined number N (a natural number) of input samples from an input signal to be inputted into the power amplifier;
   first determining including:
      classifying the input samples into a plurality of groups based on magnitudes of the input samples, and
      determining a validity of the input samples based on a distribution of classified input samples; and
   second determining including determining, when the input samples are determined to be valid, the input samples as samples to be inputted to a pre-distortion algorithm for estimating the pre-distortion coefficient,
   wherein the plurality of groups includes,
   a first group beyond a predetermined range of the magnitudes between an upper threshold and a lower threshold, and
   a plurality of second groups which are within the predetermined range of the magnitudes and are quantitatively divided by a plurality of sub-ranges.

2. The method according to claim 1, further comprising:
   third determining including, when the input samples are determined to be invalid,
      re-acquiring N input samples from the input signal, and
      determining a validity of re-acquired input samples; and
   repeating the third determining until the input samples are determined to be valid.

3. The method according to claim 1, wherein the first determining includes determining that the input samples are valid when the number of the input samples in the first group is equal to or smaller than a predetermined ratio and when the number of the input samples in each of the second groups is within a preset ratio.

4. An apparatus for determining validity of samples used to estimate a pre-distortion coefficient for compensating for a nonlinearity of a power amplifier, the apparatus comprising:
   an acquiring unit configured to acquire a predetermined number N (a natural number) of input samples from an input signal to be inputted into the power amplifier;
   a sample validity determining unit configured
      to classify the input samples into a plurality of groups based on magnitudes of the input samples, and
      to determine whether or not the input samples are valid to compensate for the nonlinearity of the power amplifier based on a distribution of classified input samples; and
   a sample determining unit configured to determine, when the input samples are determined to be valid, the input samples as samples to be inputted to a pre-distortion algorithm for estimating the pre-distortion coefficient,
   wherein the plurality of groups includes, a first group beyond a predetermined range of the magnitudes between an upper threshold and a lower threshold, and a plurality of second groups which are within the predetermined range of the magnitudes and are quantitatively divided by a plurality of sub-ranges.

5. The apparatus according to claim 4, wherein the sample validity determining unit is configured to determine that the input samples are valid when the number of the input samples in the first group is equal to or smaller than a predetermined ratio and when the number of input samples in each of the second groups is within a preset ratio.

6. The apparatus according to claim 4, wherein the sample validity determining unit is configured, when the input samples are determined to be invalid,
   to acquire the input samples that are at least partially updated from the input signal, and
   to determine whether or not the input samples having been updated are valid to compensate for the nonlinearity of the power amplifier.

7. The apparatus according to claim 4, wherein the sample validity determining unit is configured, when the input samples are determined to be invalid,
- to delete some of the input samples,
- to acquire, from the input signal, as many consecutive input samples as the number of deleted input samples, and
- to classify the consecutive input samples into the plurality of groups.

8. The apparatus according to claim 7, wherein the sample validity determining unit is configured to delete first M input samples, where M is a natural number equal to or smaller than N, from the input samples.

9. The apparatus according to claim 4, wherein the sample validity determining unit is configured, when the input samples are continued for a predetermined interval while having the same magnitude, to determine that the input samples are invalid.

10. The apparatus according to claim 4, wherein the sample validity determining unit is configured to determine the validity of the input samples based on an average and a variance of the input samples.

\* \* \* \* \*